United States Patent
Yamagishi

(10) Patent No.: US 7,500,028 B2
(45) Date of Patent: Mar. 3, 2009

(54) DMA CONTROLLER PROVIDING FOR RING BUFFER AND RECTANGULAR BLOCK TRANSFERS

(75) Inventor: Shiro Yamagishi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 206 days.

(21) Appl. No.: 10/804,178

(22) Filed: Mar. 19, 2004

(65) Prior Publication Data
US 2004/0243740 A1    Dec. 2, 2004

(30) Foreign Application Priority Data
Mar. 20, 2003  (JP)  .......... P. 2003-078049

(51) Int. Cl.
G06F 13/28  (2006.01)
G06F 3/00   (2006.01)
(52) U.S. Cl. .............. 710/22; 710/14; 710/52
(58) Field of Classification Search ............. 710/22–28, 710/52–57
See application file for complete search history.

(56) References Cited

U.S. PATENT DOCUMENTS

| | | | |
|---|---|---|---|
| 5,136,582 A * | 8/1992 | Firoozmand | 710/22 |
| 5,430,844 A * | 7/1995 | Shitara et al. | 710/26 |
| 5,708,849 A * | 1/1998 | Coke et al. | 710/22 |
| 5,983,301 A * | 11/1999 | Baker et al. | 710/22 |
| 6,111,592 A * | 8/2000 | Yagi | 710/22 |
| 6,370,601 B1* | 4/2002 | Baxter | 710/65 |
| 2002/0026543 A1* | 2/2002 | Tojima et al. | 710/22 |

FOREIGN PATENT DOCUMENTS

| | | |
|---|---|---|
| JP | 63-159961 | 7/1988 |
| JP | 02-299052 | 12/1990 |
| JP | 5-173940 | 7/1993 |
| JP | 6-4458 | 1/1994 |
| JP | 7-319799 | 12/1995 |
| JP | 09-114969 | 5/1997 |
| JP | 2000-315186 | 11/2000 |

OTHER PUBLICATIONS

Japanese Office Action issued in corresponding Japanese Patent Application No. 2003-078049, dated Mar. 14, 2006.

* cited by examiner

*Primary Examiner*—Alan S. Chen
(74) *Attorney, Agent, or Firm*—McDermott Will & Emery LLP

(57) ABSTRACT

Reducing the circuit scale by performing rectangular block transfer and ring buffer transfer in a same circuit The inventive DMA controller includes a register for setting the start address of a ring buffer, a register for setting a current transfer address, a register for setting the number of DMA transfers from the start address to the end address, a register for setting the difference between the end address and the start address, and a counter for counting the number of DMA transfers set to the register for setting the number of DMA transfers from the start address to the end address. In the DMA transfer of a rectangular area, the number of DMA transfers in a contiguous area is set to the register for setting the number of DMA transfers from the start address to the end address and the address increment of a non-contiguous area to the register for setting the difference between the end address and the start address. At the end of counting by the counter 107, the value of the register 103 and the value of the register 105 are summed to provide a next address.

4 Claims, 5 Drawing Sheets

DMA CONTROLLER PROVIDING FOR RING BUFFER AND RECTANGULAR BLOCK TRANSFERS

BACKGROUND OF THE INVENTION

1. Field of the Invention

The present invention relates to a DMA controller which performs data transfer between a memory and peripheral apparatus by way of a DMA system.

2. Description of the Related Art

In order to speed up data transfer between a memory and peripheral apparatus, a DMA controller is used as dedicated hardware for performing data transfer between the memory and the peripheral apparatus. FIGS. 2 through 7 explain a related art DMA controller. FIGS. 2 and 3 explain DMA transfer from a non-contiguous memory area in rectangular block transfer. FIG. 4 shows an address space used to explain data transfer on a ring buffer. FIG. 5 shows an address space used to explain data transfer on a ring buffer. FIG. 6 is a block diagram showing an example of the configuration of an address generator circuit in a related art DMA controller. FIG. 7 is a block diagram showing an example of a general system LSI which uses a DMA controller (DMAC).

In FIG. 7, a CPU 701 and a DMAC 702 are connected as a bus master to a high-speed bus 711. As a bus slave, a ROM 703, a RAM 704, an SDRAM 706, and a bus bridge 705 are connected to the high-speed bus 711. The bus bridge 705 is located between the high-speed bus 711 and a low-speed bus 712. To the low-speed bus 712 are connected serial apparatus 707, storage media apparatus 708 and a USB apparatus 709.

In FIG. 6, the address generator circuit 601 implements ring buffer transfer and rectangular block transfer in the DMAC 702.

Operation of rectangular block transfer is described below. In case image data is stored on the SDRAM 706 in FIG. 7, the user may wish to import, by way of DMA transfer, part of the image data rather than the entire image to the RAM 704 for processing. Such an image is for example a standby screen on a cell phone or an image of an antenna (indicating the standby state) as part of the screen. In case part of the image data is being transferred as described above, rectangular block transfer is used.

In the DMA transfer from a non-contiguous area in the rectangular block transfer shown in FIGS. 2 and 3, FIG. 3 shows the relationship between an image area 301 and a rectangular area 302 as part of the image area 301, and FIG. 2 shows the structure of the rectangular area 302 in an address space.

To transfer the rectangular area 302 in FIG. 3, DMA transfer is made for the data length L1 of an area which requires DMA transfer (contiguous area) while DMA transfer is not made for the data length L2 of an area which does not require DMA transfer (non-contiguous area) Referring to the address space in FIG. 2, areas such as the areas from address 201 to address 202, from address 203 to address 204, and from address 205 to address 206 are transferred in order to transfer the rectangular area 302.

That is, once the data having the data length L1 from the start address 201 to address 202 is transferred, the area for the data length L2 need not be transferred, so that the transfer address jumps from address 202 to address 203. Similarly, the area having the data length L1 from address 203 to address 204 is transferred then the transfer address jumps from address 204 to address 205. This performs transfer of a rectangular area.

Operation of generating the rectangular address mentioned above in the address generator circuit 601 will be described. Register setting from the CPU 701 to the DMAC 702 sets DMA transfer parameters. In this practice, a start address is set to a register 602, the number of DMA transfers for the contiguous area to a register 606, and the address increment of the non-contiguous area to a register 605.

Next, DMA transfer starts. The value of the register 602 where a start address is set is selected by a multiplexer 610 and set to a register 611 which retains the transfer address output and a register 603 provided to internally reference the transfer address. Then, the value of a register 604 which retains the address increment and the value of the register 603 which retains a transfer address selected by a multiplexer 608 are summed by an adder 609. The resulting value is selected by the multiplexer 610 and set to the register 611 and the register 603 again.

The address increment is 1 in case ordinary addresses are incremented one by one for transfer while it is 4 in case addresses are assigned per eight bits on a 32-bit bus. Assuming a current transfer address as ADC, a next transfer address as ADN and an increment as AI, the expression holds: ADC=ADC+AI.

The value of the register 606 where the number of DMA transfers is set is loaded into a counter 607 at the start of DMA transfer and decrements the counter 607 per DMA transfer cycle. Occurrence of underflow in the counter 607. indicates the end of DMA transfer. In this practice, the multiplexer 608 selects the output of an adder 615 in order to add the address increment of the non-contiguous area and loads the value of the register 606 to the counter 607 again.

The adder 615 sums up the register 603 where the address increment of the non-contiguous area is set and the register 603 where the current transfer address is retained. Assuming the address increment of the non-contiguous area as ADR, the next transfer address ADN is given by the expression ADN=ADC+ADR+AI.

In this case, ADR and AI are summed because the last address in a contiguous area is smaller than the first address of a non-contiguous area by AI and adding the address increment of a non-contiguous area to the last address of a contiguous area makes the last address of the non-contiguous area.

In this way, by switching the selection by the multiplexer 608 to jump to the start address of the next contiguous area, DMA transfer of a rectangular area shown in FIG. 3 is performed.

Operation of a ring buffer is described below. Data from the serial apparatus 707 or the USB apparatus 709 is stored into a memory such as a FIFO inside the serial apparatus 707 or the USB apparatus 709 and transferred to the RAM 704 or the SDRAM 706 by the DMAC 702. In case such contiguous data is sequentially received, a certain range on the RAM 704 may be configured as a ring buffer.

In an address space used to explain data transfer in a ring buffer shown in FIGS. 4 and 5, a numeral 401 denotes the start address of a ring buffer and 402 the end address of the ring buffer.

Data received from the USB apparatus 709 is sequentially stored from the start address 401. Once address 402 is reached, a transfer address is returned to address 401. Similarly, in case data is read from a ring buffer, data is read sequentially from the start address 402, with a transfer address being returned to address 401 once address 402 is reached.

Here, WP is the transfer address of a DMA controller which writes data into memory while RP is the transfer address of a DMA controller which reads data from memory. WP and RP operate in synchronization In FIG. 4, an area M1 is an area where data is written and read, an area M2 an area where data is once written but waiting to be read, an area M3 an area where data is not yet written FIG. 5 shows a state where a predetermined time has elapsed from the state in FIG. 4 and WP has returned at 402. In an area M4, a second write is complete and a first read has been made but the second write data is not yet read. An area M5 is and area where data is written once and read once. An area M6 is an area where data is written once and waiting for a first read.

In order to perform data transfer to a ring buffer, a related art DMA controller comprises a register 612 for specifying the start address of a ring buffer, a register 613 for specifying the end address of the ring buffer; and a comparator for comparing a register 603 which retains the current transfer address and the register 613, wherein a multiplexer 610 selects the register 612 which retains the start address of the ring buffer (refer to for example the Japanese Patent Laid-Open No. 4458/1994), In the related art method, in order to perform DMA transfer to a ring buffer, it is necessary to add circuits dedicated to the ring buffer such as a start address register and an end address register for the ring buffer as well as a comparator.

A general-purpose DMA controller must often support transfer of a non-contiguous area such as a rectangular area mentioned above. In order to support all the requests for additional features to such a general-purpose DMA controller, the circuit required is complicated as shown in FIG. 6 thus resulting in a larger circuit scale. This problem is eminent especially in case a plurality of peripheral devices and a plurality of channels are provided to perform DMA transfer.

SUMMARY OF THE INVENTION

The invention solves the related art problems and aims at providing a DMA controller which performs rectangular block transfer and ring buffer transfer in a same circuit to perform DMA transfer to a ring buffer, thereby eliminating the need for additional circuits dedicated to the ring buffer and reducing the circuit scale.

A first aspect of the invention provides a DMA controller which generates ring buffer addresses, the DMA controller comprising a first register for setting the start address of a ring buffer, a second register for setting the number of DMA transfers from the start address to the end address of the ring buffer, and a third register for setting the difference between the end address and the start address of the ring buffer.

With this configuration, DMA transfer is performed by using the general-purpose first through third register circuits. This eliminates the need for additional circuits dedicated to the ring buffer thus reducing the circuit scale.

A second aspect of the invention provides the DMA controller according to the first aspect, wherein the second register is used as a register for setting the number of DMA transfers in a contiguous area including rectangular areas in the DMA transfer of a rectangular area included in an area.

With this configuration, rectangular block transfer and ring buffer transfer are performed in a same circuit concerning the second register for setting the number of DMA transfers from the start address to the end address of the ring buffer. This reduces the circuit scale.

A third aspect of the invention provides the DMA controller according to the first or second aspect, wherein the third register is used as a register for setting the address increment of a non-contiguous area in the DMA transfer of a rectangular area included in an area.

With this configuration, rectangular block transfer and ring buffer transfer are performed in a same circuit concerning the third register for setting the difference between the end address and the start address of the ring buffer. This reduces the circuit scale.

A fourth aspect of the invention provides the DMA controller according to any of the first through third aspects, the DMA controller comprising a fourth register for retaining a current transfer address, a counter for counting the number of DMA transfers set to the second register, and an adder for summing the value of the third register and the value of the fourth register when the counter has completed counting the number of DMA transfers set to the second register.

With this configuration, by way of a circuit configuration using the general-purpose first through fourth register circuits and a counter for counting the number of DMA transfers, DMA transfer to a ring buffer and DMA transfer of a rectangular area are performed in a same circuit. This eliminates the need for additional circuits dedicated to the ring buffer thus reducing the circuit scale.

A fifth aspect of the invention provides a program for executing DMA transfer to a ring buffer, wherein, in the case of ring buffer transfer, the program causes a computer to work as means for setting the start address of a ring buffer to a first register, means for setting the number of DMA transfers from the start address to the end address of the ring buffer to a second register, means for setting the difference between the end address and the start address of the ring buffer to a third register, and in the case of rectangular block transfer, the program causes the computer to work as means for setting the start address at the start of transfer to the first register, means for setting the number of DMA transfers in a contiguous area including rectangular areas to a second register, and means for setting the address increment of a non-contiguous area to the third register.

DESCRIPTION OF THE PREFERRED EMBODIMENTS

Figure 1:
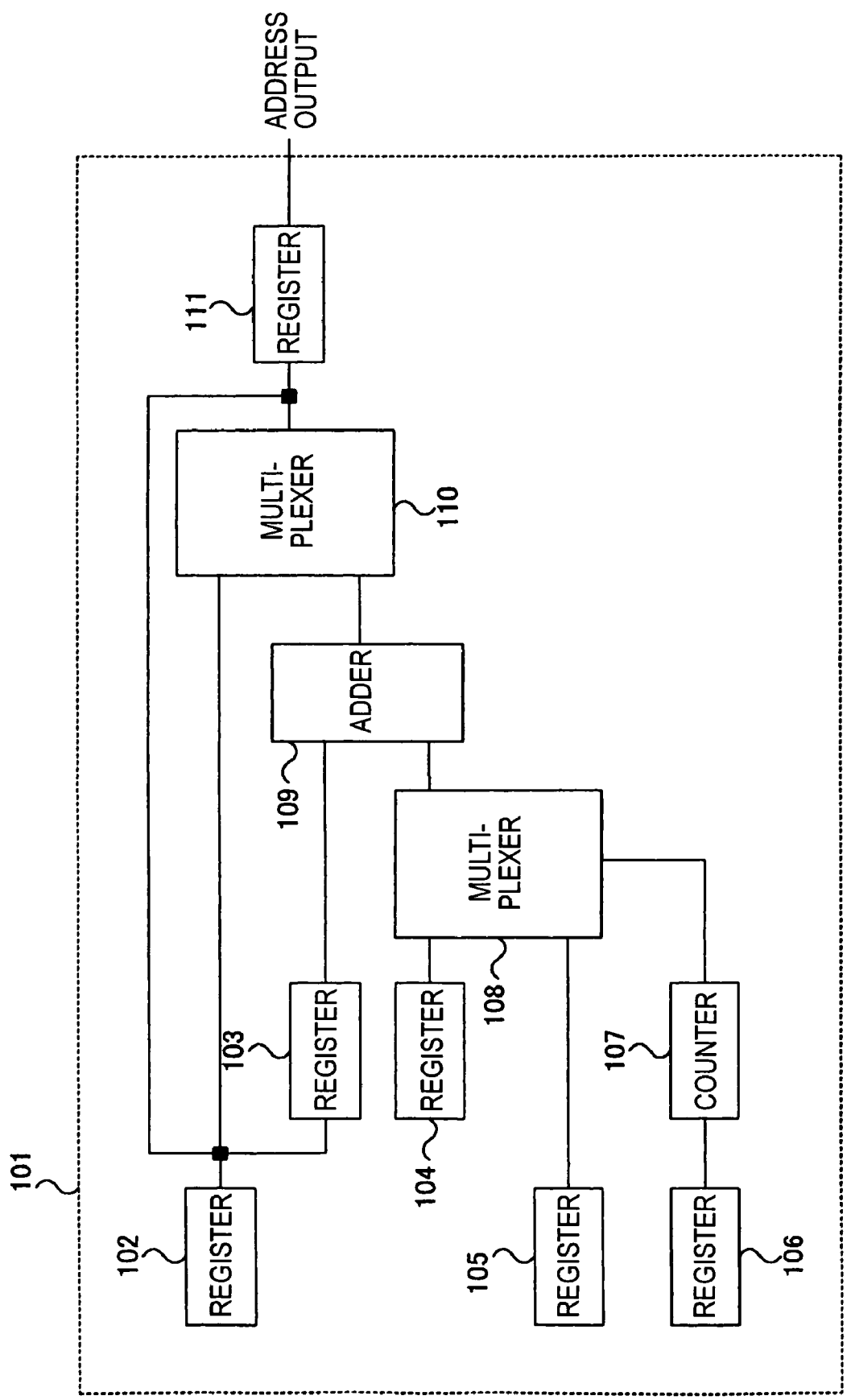
FIG. 1 is a block diagram showing the configuration of an address generator circuit of a DMA controller according to an embodiment of the invention.
Figure 2:
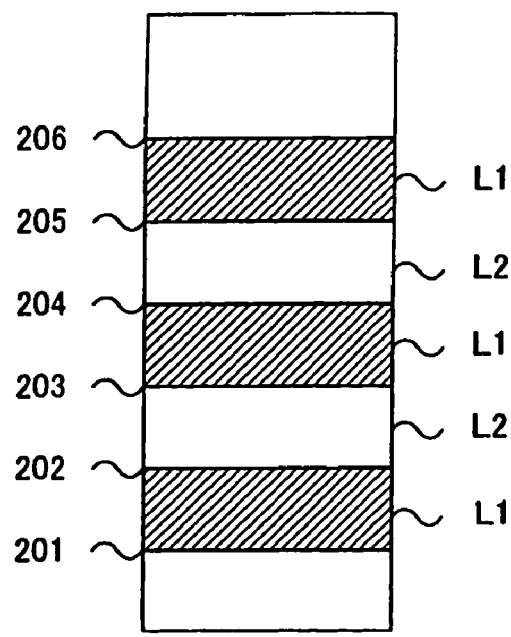
FIG. 2 shows the structure of rectangular areas in an address space.
Figure 3:
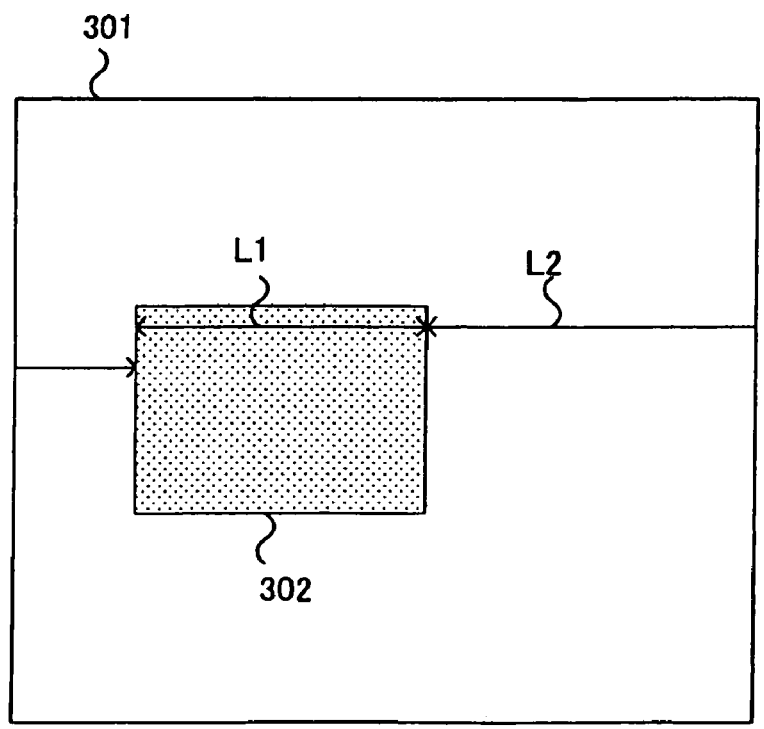
FIG. 3 shows the relationship between a contiguous area and a non-contiguous area in rectangular block transfer.
Figure 4:
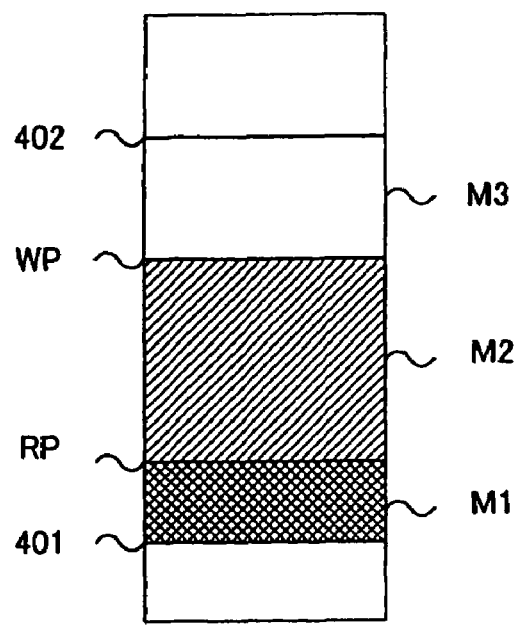
FIG. 4 shows an address space used to explain data transfer on a ring buffer.
Figure 5:
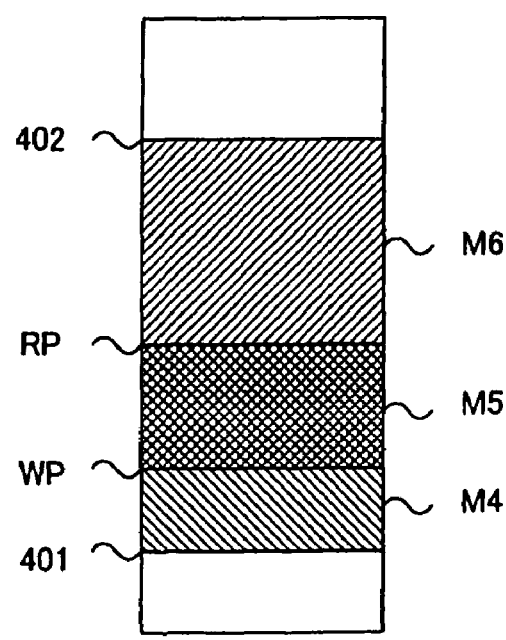
FIG. 5 shows an address space used to explain data transfer on a ring buffer.
Figure 6:
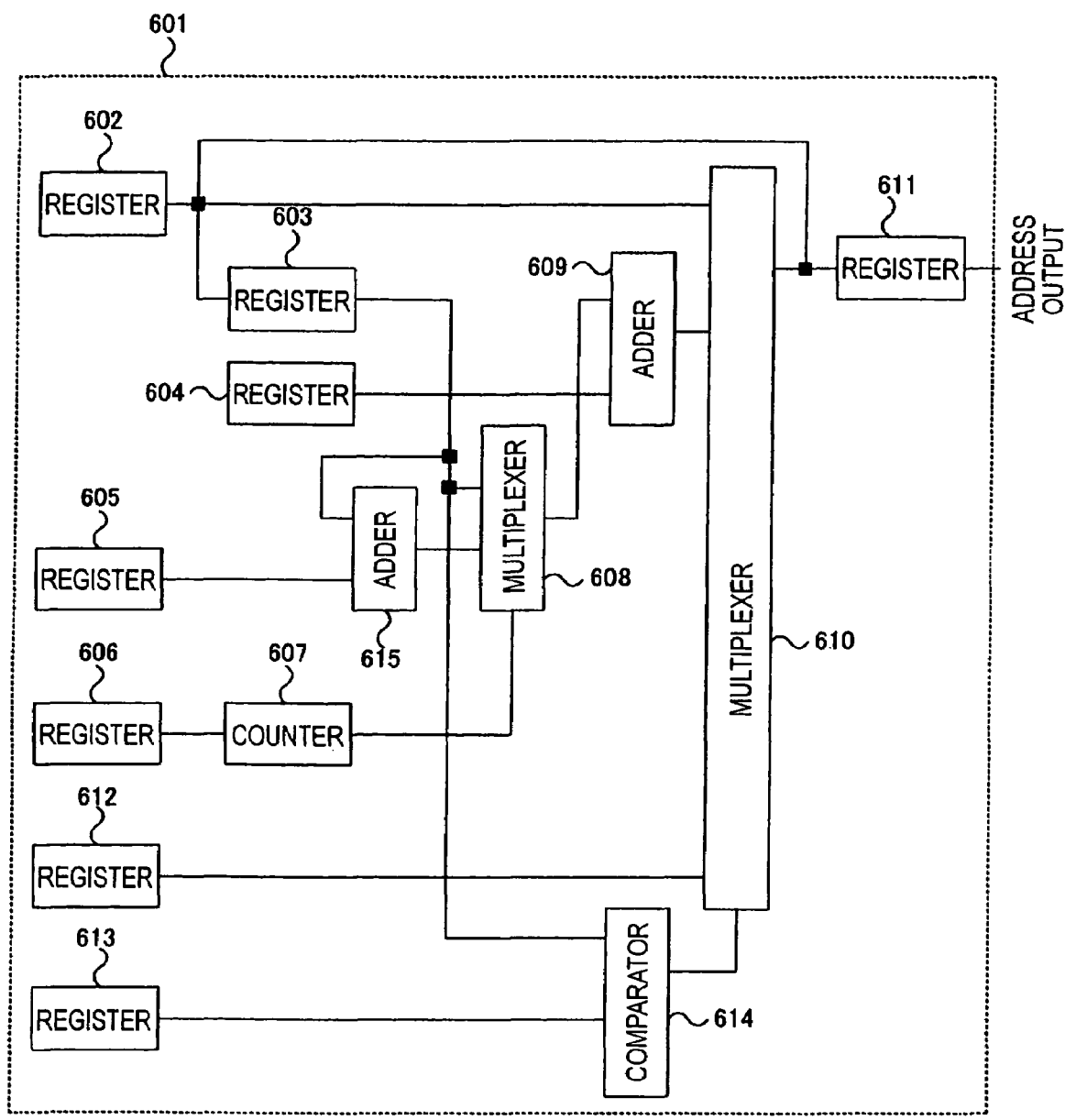
FIG. 6 is a block diagram showing an example of the configuration of an address generator circuit in a related art DMA controller.
Figure 7:
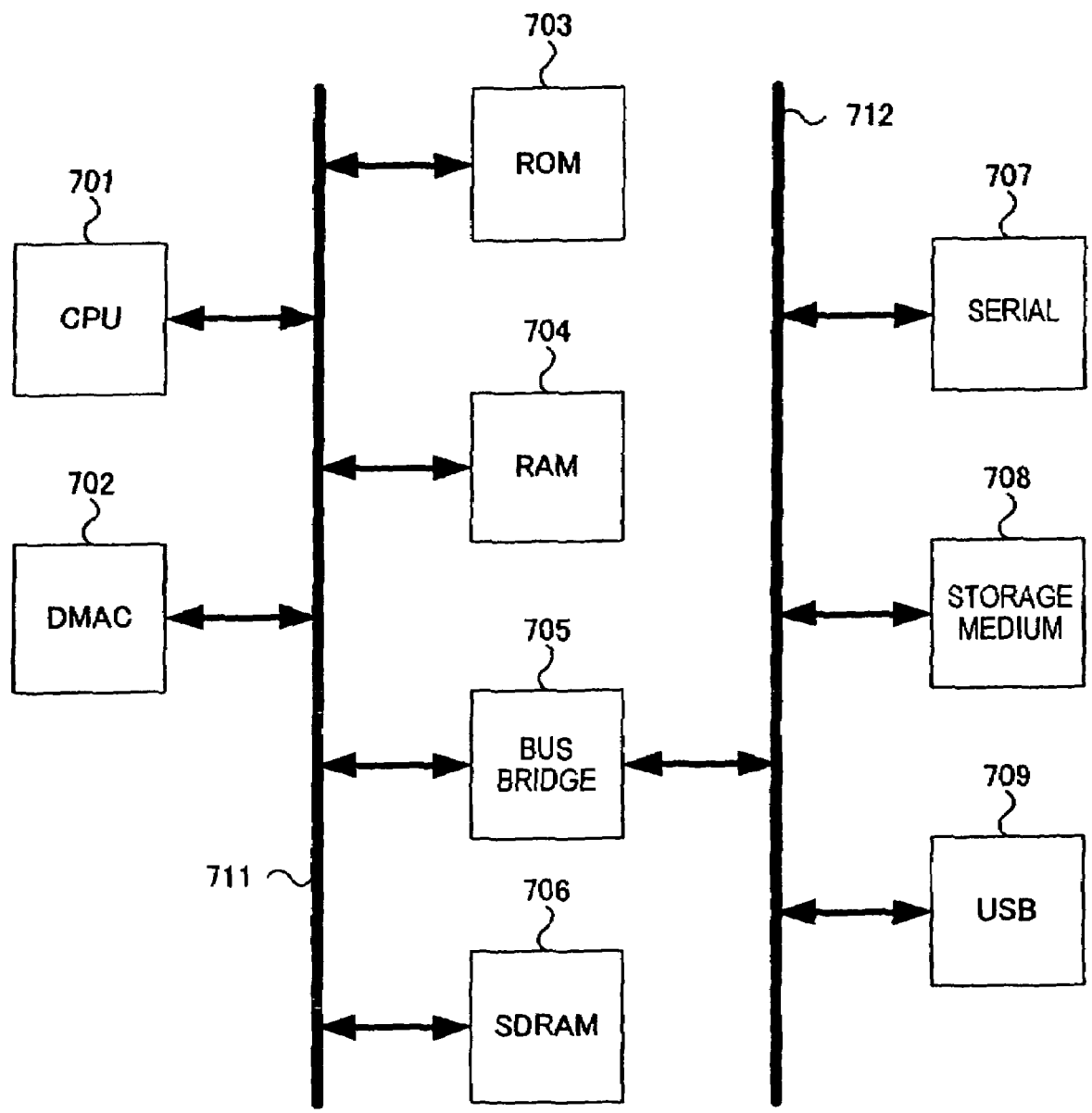
FIG. 7 is a block diagram showing an example of a general system LSI which uses a DMA controller.

Embodiments of the intention will be described referring to drawings. FIG. 1 is a block diagram showing the configuration of an address generator circuit of a DMA controller according to an embodiment of the invention.

In FIG. 1, an address generator circuit 101 comprises DMA control registers 102, 105, 106, a register 111 for retaining a DMA transfer address, internal control registers 103, 104, a counter 107, multiplexers 108, 110, and an adder 109.

Operation to perform transfer to a ring buffer is described below. The register 102 sets the start address of the ring buffer. The register 106 sets the number of transfers from the start address to the end address of the ring buffer. The register 105 sets the difference between the start address and the end address of the ring buffer by using a two's-complement number.

Execution of a control program sets a value used to perform desired DMA data transfer to each register before DMA transfer starts. Just after DMA transfer has started, the multiplexer 110 passes the value of the register 102 to the register 111 and the register 103. From the DMA controller, the value of the register 111 is output as the start address of the ring buffer.

Subsequently, the multiplexer 110 selects the output from the adder 109. The multiplexer 108 typically selects the register 104 for retaining the address increment per DMA transfer cycle. The value of the register 104 and the value of the register 103 for retaining the current transfer address are input to the adder 109, so that the sum of the value of the register 103 and the value of the register 104 is set to the register 111.

This sequentially increments the addresses in the transfer area of a ring buffer. The value of the register 106 for retaining the ring buffer size information is loaded into the counter 107 at the same time as the start of transfer and the counter 107 is decremented per DMA transfer cycle.

When a DMA transfer address reaches the end address of a ring buffer, the counter 107 underflows When the counter 107 underflows, the multiplexer 108 selects the register 105. This causes the adder 109 to sum the value of the register 103 and the value of the register 105.

The difference between the start address and the end address of the ring buffer is set to the register 105 by using a two's-complement number. The difference is subtracted from the value of the register 103. The start address of the ring buffer is set to the registers 111 and 103.

Assuming a current transfer address retained in the register 103 as ADC and a next transfer address as ADN, the end address of the ring buffer as ARE and the start address of the ring buffer as ARS, address calculation expression at occurrence of an underflow of the counter 107 will be obtained: ADN=ADC+(ARS−ARE), because ARS−ARE is set to the register 105

ADC is equal to the end address ARE of the ring buffer at the occurrence of underflow in the counter 107, thus ADN=ARS. The next transfer address is the start address of the ringbuffer. By repeating the above operation, data transfer to a ring buffer is implemented in the circuit configuration in FIG. 1

To perform transfer to a rectangular area, a start address to start DMA transfer is to be set to the register 102, the number of DMA transfers of a contiguous area to the register 106, and the address increment of a non-contiguous area to the register 105.

The operation is the same as that of the ring buffer mentioned earlier. The address increment is set to the register 105 selected by the multiplexer 108 when the underflow takes place in the counter 107. Assuming the address increment of a non-contiguous area as ADR, a next transfer address as ADN and typical transfer address increment as AI, the expression ADN=ADC+ADR+AI holds.

In the related art, two adders have been used to perform this operation. For example, in case 32-bit-based DMA transfer is performed when addresses are assigned per 8 bits on a 32-bit bus, a typical address increment is 4. In this case, it is not necessary to operate ADN=ADC+ADR+AI Two approaches are used to perform this operation on a single adder. One is to set ADR+4 rather than ADR to the register 105 for setting the address increment of a non-contiguous area. The other is to control the adder to further add 4.

For the latter, for example in the 32-bit-based DMA transfer where transfer addresses are arranged per 32 bits, the lowest two bits of an address are zero so that the lowest two bits of an address may be fixed to 1 in order to add 3. Further, carry operation is made to provide ADN=ADC+ADR+3+1 (carry operation).

Note that, in case the control of an adder circuit is fixed, this control is still valid for the ring buffer transfer mentioned earlier. Thus, it is necessary to set ARS−(ARE+4) to the register 5 for setting the difference between the start address and the end address of the ring buffer.

As mentioned hereinabove, according to the invention, it is possible to perform DMA transfer to a ring buffer and DMA transfer of a rectangular area in a same circuit by way of a general-purpose counter using a register and a counter for counting the number of DMA transfers. This eliminates the need for additional circuits dedicated to the ring buffer thus reducing the circuit scale.

What is claimed is:

1. A DMA controller capable of generating ring buffer addresses, comprising:
a first register, which, in a first mode of operation, sets the start address of a ring buffer,
a second register, which, in said first mode of operation, sets the number of DMA transfers from the start address to the end address of the ring buffer, and
a third register, which, in said first mode of operation, contains the difference between the end address and the start address of the ring buffer,
wherein, in a second mode of operation, the third register sets the address increment of a non-contiguous area in the DMA transfer of a rectangular area.

2. The DMA controller according to claim 1, wherein, in a second mode of operation, the second register is used as a register for setting the number of DMA transfers in a contiguous area including rectangular areas in the DMA transfer of a rectangular area included in an area.

3. The DMA controller according to any of claims 1 through 2, further comprising:
a fourth register, which retains a current transfer address,
a counter, which counts the number of DMA transfers set to the second register, and
an adder, which sums the value of the third register and the value of the fourth register when the counter has completed counting the number of DMA transfers set to the second register.

4. A computer readable medium encoded with a computer program for executing DMA transfer to a ring buffer, wherein, in the case of ring buffer transfer, the program causes a computer to work as means for setting the start address of a ring buffer to a first register, means for setting the number of DMA transfers from the start address to the end address of the ring buffer to a second register, and means for setting the difference between the end address and the start address of the ring buffer to a third register,
and in the case of rectangular block transfer, said program causes the computer to work as the means for setting the start address at the start of the transfer to said first register, means for setting the number of DMA transfers in a contiguous area including rectangular areas to the second register, and means for setting the address increment of a non-contiguous area to the third register.

* * * * *